United States Patent
Shindo et al.

(10) Patent No.: US 6,506,699 B1
(45) Date of Patent: *Jan. 14, 2003

(54) NEGATIVE THERMAL EXPANSION GLASS CERAMIC AND METHOD FOR PRODUCING THE SAME

(75) Inventors: Ayako Shindo, Sagamihara (JP); Naoyuki Goto, Sagamihara (JP)

(73) Assignee: Kabushiki Kaisha Ohara, Sagamihara (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/418,754

(22) Filed: Oct. 15, 1999

(30) Foreign Application Priority Data

| Oct. 23, 1998 | (JP) | 10-302585 |
|---|---|---|
| Jul. 8, 1999 | (JP) | 11-194799 |
| Aug. 30, 1999 | (JP) | 11-243726 |
| Oct. 7, 1999 | (JP) | 11-287138 |

(51) Int. Cl.$^7$ .......... C03C 10/12; C03C 10/14
(52) U.S. Cl. .............. 501/7; 501/4; 65/33.8
(58) Field of Search ............. 501/4, 7; 65/33.8

(56) References Cited

U.S. PATENT DOCUMENTS

| 3,253,975 A | 5/1966 | Olcott et al. |
|---|---|---|
| 3,537,868 A | 11/1970 | Kosaka |
| 3,677,785 A | * 7/1972 | Horikawa et al. ............ 501/7 |

(List continued on next page.)

FOREIGN PATENT DOCUMENTS

| EP | 0812810 A2 | 12/1997 |
|---|---|---|
| JP | 61-53131 | * 3/1986 |
| JP | 63-201034 | 8/1988 |
| JP | 02-208256 | 8/1990 |
| JP | 2-208256 | 8/1990 |
| JP | 10-073740 | 3/1998 |
| JP | 10-90555 | 4/1998 |
| JP | 10-96827 | 4/1998 |
| JP | 10-096827 | 4/1998 |
| WO | WO97/14983 | 4/1997 |
| WO | WO 97/26572 | 7/1997 |
| WO | WO 97/28480 | 8/1997 |
| WO | 98/22405 | * 5/1998 |
| WO | WO 99/06859 | 2/1999 |
| WO | WO 99/64898 | 12/1999 |
| WO | WO 01/04672 | 1/2001 |

OTHER PUBLICATIONS

J. Shyu et al., "Sintering, Crystallization, and Properties of $B_2O_3/P_2O_5$–Doped $Li_2O \cdot Al_2O_3 \cdot 4SiO_2$ Glass–Ceramics", Journal of the American Ceramic Society, vol. 78, No. 8, Aug. 1, 1995, pp. 2161–2167.

E. G. Wolff, "Thermal Expansion in Metal/Lithia–Alumina–Silica (LAS) Composites", Ninth International Thermal Expansion Symposium, Pittsburgh, PA, Dec. 8–10, 1996 (Abstract No. XP002131090).

Primary Examiner—Karl Group
(74) Attorney, Agent, or Firm—Oliff & Berridge, PLC (57) ABSTRACT

A negative thermal expansion glass ceramic having a negative coefficient of thermal expansion, which is a sufficiently large absolute value in a temperature range of −40° C. to +160° C. and a method for producing the same are provided. The negative thermal expansion glass ceramic has a coefficient of thermal expansion of −25 to −100×10$^{-7}$/° C. in the temperature range of −40° C. to +160° C., and comprises main crystalline phases which are one or more types selected from a group consisting of β-eucryptite solid solution (β-$Li_2O.Al_2O_3.2SiO_2$ solid solution), β-eucryptite (β-$Li_2O.Al_2O_3.2SiO_2$), β-quartz solid solution (β-$SiO_2$ solid solution), and β-quartz (β-$SiO_2$), wherein a total amount of crystals of the main crystalline phases can be 70 to 100% in mass percent.

10 Claims, 2 Drawing Sheets

U.S. PATENT DOCUMENTS

| | | | |
|---|---|---|---|
| 3,997,886 A | | 12/1976 | Muller |
| 4,018,612 A | * | 4/1977 | Chyung .......................... 501/4 |
| 4,209,229 A | | 6/1980 | Rittler |
| 4,507,392 A | * | 3/1985 | Rittler ........................... 501/4 |
| 5,017,519 A | * | 5/1991 | Morimoto et al. ............. 501/7 |
| 5,336,643 A | * | 8/1994 | Goto et al. .................... 501/4 |
| 5,491,115 A | * | 2/1996 | Pfitzenmaier et al. .......... 501/4 |
| 5,694,503 A | | 12/1997 | Fleming et al. |
| 5,721,802 A | | 2/1998 | Francis et al. |
| 5,926,599 A | | 7/1999 | Bookbinder et al. |
| 6,060,412 A | * | 5/2000 | Ishida ........................... 501/4 |
| 6,087,280 A | * | 7/2000 | Bealle et al. ................... 501/7 |
| 6,124,223 A | * | 9/2000 | Beall et al. .................... 501/4 |
| 6,187,700 B1 | | 2/2001 | Merkel |
| 6,209,352 B1 | | 4/2001 | Beall et al. |

\* cited by examiner

NEGATIVE THERMAL EXPANSION GLASS CERAMIC AND METHOD FOR PRODUCING THE SAME

BACKGROUND OF THE INVENTION

1. Field of the Invention

The present invention relates to a negative thermal expansion glass ceramic being able to be used for wide purposes in an energy-related field, an information communication field, an electronics field, or other fields, particularly in an optical communication field, being used as a temperature compensating member in a device containing an optical fiber, such as an optical fiber refractive index grating, a connector, or the like, and a method for producing the same.

2. Description of Related Art

The optical technique is applied to not only a field of communication systems, but also wide fields, such as precise processing techniques, medical techniques, home electronic products, or industrial electronics. With the optical technique, emitting of light, condensing of light, transmission and divergence of light, or the like are carried out by using the optical fiber.

The various devices using the optical fiber are required to have a structure which does not harm characteristics of the optical fiber itself. That is, in order to prevent changing of the optical properties, which is caused by expansion, contraction, or the like of the optical fiber by a temperature change, it is required to combine materials having a desired coefficient of thermal expansion. For example, a device using a material having a negative coefficient of thermal expansion has been proposed.

For example, Japanese Patent Laid-open No. Hei 10-90555 discloses that a material having a negative coefficient of thermal expansion, concretely, liquid crystal polymer is used at a flanged portion of ferrule made of zirconia or stainless steel having a positive coefficient of thermal expansion, in a single-core optical connector.

WO Publication No.97/14983 discloses an optical fiber diffraction grating in which liquid crystal polymer having a negative coefficient of thermal expansion covers peripheries of an optical fiber having a positive coefficient of thermal expansion in order to prevent the expanding and contracting caused by temperature changes of the optical fiber. The disclosed liquid crystal polymer (polyesteramide) has a coefficient of thermal expansion of $-1.8 \times 10^{-5}/°$ C. to $-7.2 \times 10^{-6}/°$ C.

Further, Japanese Patent Laid-open No. Hei 10-96827 discloses a package in which an optical fiber being provided with a refractive index grating is mounted to a supporting member having compositions based on Zr-tungstate or Hf-tungstate having a negative coefficient of thermal expansion. Concretely, a sintered body having a coefficient of thermal expansion of $-12.4 \times 10^{-6}/°$ C. is formed from $ZrW_2O_8$ powders having a coefficient of thermal expansion of $-4.7$ to $-9.4 \times 10^{-6}/°$ C.

For various instruments or apparatus in the energy-related field, an information field, or other fields, in order to prevent occurring strain or internal stress by temperature differences, a material is required, which is able to adjust the coefficient of thermal expansion to desired values, of the devices or precision parts constituting the instruments or the apparatus, moreover, which enables satisfying dimensional precision, dimensional stability, strength, thermal stability, or the like. Further, a material is required, which is mixed with organic substances or inorganic substances, for example, an adhesive, a sealing compound, or the like used in the various devices or precision parts, which enables adjusting the coefficient of thermal expansion to desired values, of these substances. Moreover, the material is required to satisfy the dimensional precision, the dimensional stability, the strength, the thermal stability, or the like of these substances.

For these materials, because of having a large heat resistance, a small coefficient of thermal expansion, or the like, ceramics, glass ceramics, glasses, metals, or other materials have been used. However, these materials have the positive coefficient of thermal expansion, that is, the materials have a property that they expand when the temperature raises. Accordingly, these materials are not necessarily optimum materials.

Therefore, for the materials used in the various devices or mixed with the substances used in the various devices, a material which has a negative coefficient of thermal expansion to negate the positive coefficient of thermal expansion of other materials used with the materials, the organic substances or the inorganic substances is desired. That is, the material having a property of contraction when the temperature raises is desired.

For the materials having the negative coefficient of thermal expansion, generally, inorganic substances, such as β-eucryptite crystals, $Li_2O$—$Al_2O_3$—$SiO_2$ system ceramics containing the crystals, $Li_2O$—$Al_2O_3$—$SiO_2$ system glass ceramics, ZnO—$Al_2O_3$—$SiO_2$ system glass ceramics, lead titanium, hafnium titanium, zirconium tungstate, tantalum tangstate have been known.

For example, Japanese Patent Laid-open No. Sho 63-201034 discloses a method for producing a crystallized glass (glass ceramics) having a negative coefficient of thermal expansion, wherein $Al_2O_3$ and $Li_2O$ powders within an amount of a specific range are mixed with powders of volcanic vitreous deposits, the mixture is heated and melted, thereafter processed to remove strain thereof, further reheated at a temperature of a specific range for 12 to 24 hours, and thereafter annealed to obtain the crystallized glass.

With the method, by varying conditions of the heat-treatment times and heat-treatment temperatures, the crystallized glass having the negative coefficient of thermal expansion of approximately $-60 \times 10^{-7}/°$ C. is obtained, which is the largest absolute value among obtained values.

However, the various materials in the publications, having the negative coefficient of thermal expansion have various problems as follows.

In the Japanese Patent Laid-open No. Hei 10-90555 and WO Publication No.97/14983, the liquid crystal polymer used as the negative thermal expansion material is crystalline resin, so that orientation of the crystal is high. For example, there is a problem that warping is occurred in an injection-molded product. In addition, there is a problem that values of physical properties, such as the coefficient of thermal expansion, flexural strength, modulus of elasticity, or other values differ according to directions of the liquid crystal molecules.

The $ZrW_2O_8$ or $HfW_2O_8$ used as the temperature compensating members in the Japanese Patent Laid-open No. Hei 10-96827 is not thermally stable within a wide temperature range because a phase transition occurs therein at nearly 157° C. to occur a bending in a curve of thermal expansion.

The crystallized glass disclosed in the Japanese Patent Laid-open No. Sho 63-201034 is made from the volcanic vitreous deposits, so that contents of respective components, such as alkaline metal oxides, alkaline earth oxides, and transition metal oxides expect $SiO_2$ and $Li_2O$, which are main components and necessary to deposit the main crystalline phase are not able to be adjusted. Accordingly, it has disadvantages that it is difficult to avoid a composition change, to deposit desired crystalline phase of a desired amount, and to produce a crystallized glass having the stable physical properties and qualities.

Further, as shown in the disclosed examples of the publication, mixed powders are melted to be cullets, the cullets are ground and melted again at 1600° C. in the producing method. Accordingly, the processes are complicated and the melting temperature of the glass is very high, so that there are problems that the production requires labors, times and costs.

Japanese Patent Laid-open No. Hei 2-208256 discloses low thermal expansion ceramics of $ZnO$—$Al_2O_3$—$SiO_2$ system, wherein the main crystalline phases are β-quartz solid solution and/or zinc petalite solid solution. The ceramics, as shown in examples, have the coefficient of thermal expansion of at lowest $-2.15 \times 10^{-6}/°$ C. ($-21.5 \times 10^{-7}/°$ C.), so that the ceramics do not have a sufficiently low coefficient of thermal expansion.

Further, because these ceramics contain a large amount of ZnO component which is easy to sublime at a high temperature, It is described in the publication that when a parent glass (base glass) is formed, too long melting is not preferable. As shown in the examples in the publication, the melting time is ten minutes which is extremely short. However, in such the short time, even if the temperature is high, the $SiO_2$ and $Al_2O_3$ components do not melt sufficiently to remain, so that it is difficult to obtain a homogeneous parent glass. Accordingly, if the heterogeneous parent glass is crystallized, the production of the homogeneous ceramics is difficult.

When the raw materials are melted, if they are melted for hours as an ordinary way, it is possible to solve the problem about the residues. In this case, however, the ZnO component sublimes to vary the composition of the parent glass, so that it is difficult to obtain the ceramics which is stably homogeneous.

Further, the melting temperature in the example is 1620° C. which is high, so that there are the same problems as the producing method disclosed in the Japanese Patent Laid-open No. Sho 63-201034.

As described above, because the earlier materials having the negative coefficient of thermal expansion have some problems, actually, they are less used in the energy-related field, the information field, the optical communication field, or other various fields.

SUMMARY OF THE INVENTION

The present invention was developed in view of the above-described problems. Therefore, an object of the present invention is to provide a negative thermal expansion glass ceramic having a negative coefficient of thermal expansion which is a sufficiently large absolute value in a general temperature range of $-40°$ C. to $+160°$ C. when the glass ceramics are used in the energy-related fields, the information field, the optical communication field, or other fields, being able to be produced with a low cost and stably regarding to compositions and physical properties, and being able to be used as a temperature compensating member. Another object of the present invention is to provide a method for producing the same.

Inventors have made various efforts and experiments to solve the problems above-described. As a result, it is found that $Li_2O$—$Al_2O_3$—$SiO_2$—$BaO$ system glass of a specific composition range is subjected to a heat treatment to crystallize, thereby the glass ceramic having a negative coefficient of thermal expansion which is a large absolute value and having little anisotropy is obtained. Then, the inventors have achieved the invention.

In order to accomplish the above-described object, in one aspect of the present invention, a negative thermal expansion glass ceramic has a coefficient of thermal expansion of $-25$ to $-100 \times 10^{-7}/°$ C. in a temperature range of $-40°$ C. to $+160°$ C.

The negative thermal expansion glass ceramic can comprise main crystalline phases which are one or more types selected from a group consisting of β-eucryptite solid solution (β—$Li_2O.Al_2O_3.2SiO_2$ solid solution), β-eucryptite (β—$Li_2O. Al_2O_3.2SiO_2$)β-quartz solid solution (β-$SiO_2$ solid solution), and β-quartz (β-$SiO_2$).

In the negative thermal expansion glass ceramic, a total amount of crystals of the main crystalline phases can be 70 to 100% in mass percent.

The negative thermal expansion glass ceramic can be produced by subjecting a base glass to a heat treatment, wherein the base glass can comprise, in mass percent, the following components:

| | |
|---|---|
| $SiO_2$ | 40–65% |
| $Al_2O_3$ | 25–45% |
| $Li_2O$ | 5–15% |
| $B_2O_3$ | 0–3% |
| BaO | 0.5–4% |
| MgO | 0–2% |
| CaO | 0–3% |
| ZnO | 0–6% |
| $P_2O_5$ | 0–4% |
| $ZrO_2$ | 0–4% |
| $TiO_2$ | 0–4% |
| $As_2O_3 + Sb_2O_3$ | 0–2% | and the base glass can be essentially free of PbO, $Na_2O$, and $K_2O$.

The negative thermal expansion glass ceramic can be produced by melting a base glass, quenching the molten glass, reducing the quenched glass to powders to form, and firing the formed product to crystallize, wherein the base glass can comprise, in mass percent, the following components:

| | |
|---|---|
| $SiO_2$ | 40–65% |
| $Al_2O_3$ | 25–45% |
| $Li_2O$ | 5–15% |
| $B_2O_3$ | 0–3% |
| BaO | 0.5–4% |
| MgO | 0–2% |
| CaO | 0–3% |
| ZnO | 0–6% |
| $P_2O_5$ | 0–4% |
| $ZrO_2$ | 0–4% |
| $TiO_2$ | 0–4% |
| $As_2O_3 + Sb_2O_3$ | 0–2% | and the base glass can be essentially free of PbO, $Na_2O$, and $K_2O$.

The negative thermal expansion glass ceramic can be produced by melting a base glass, forming the molten glass, annealing the formed glass as needed; and heating the formed product to crystallize, wherein the base glass can comprise, in mass percent, the following components:

| | |
|---|---|
| $SiO_2$ | 40–65% |
| $Al_2O_3$ | 25–45% |
| $Li_2O$ | 5–15% |
| $B_2O_3$ | 0–3% |
| BaO | 0.5–4% |
| MgO | 0–2% |
| CaO | 0–3% |
| ZnO | 0–6% |
| $P_2O_5$ | 0–4% |
| $ZrO_2$ | 0–4% |
| $TiO_2$ | 0–4% |
| $As_2O_3 + Sb_2O_3$ | 0–2% | and the base glass can be essentially free of PbO, $Na_2O$, and $K_2O$.

The negative thermal expansion glass ceramic has the negative coefficient of thermal expansion, which is a large absolute value.

In addition, although the negative thermal expansion glass ceramic has a crystallized region, this glass ceramic does not have a specific orientation as a whole material, so that the negative thermal expansion glass ceramic can be a material having little anisotropy.

Accordingly, the negative thermal expansion glass ceramic can be applied to a temperature compensating member, with combined with a material having a positive coefficient of thermal expansion.

Particularly, the negative thermal expansion glass ceramic can be suitably applied to a device securing an optical fiber.

According to the negative thermal expansion glass ceramic, the glass ceramic can be used as a temperature compensating member with combined with a material having a positive coefficient of thermal expansion, thereby it can be possible to the utmost to prevent an adverse effect of temperature change of the devices or the like.

As the devices securing the optical fiber, for example, the optical fiber diffraction grating, the optical connector, or the like used in the optical communication field can be included.

In accordance with another aspect of the invention, a method for producing a negative thermal expansion glass ceramic, comprises the steps of: melting a base glass; quenching the molten base glass; reducing the quenched base glass to powders to form; and firing the formed product at a temperature range of 1200° C. to 1350° C. to crystallize; wherein the base glass comprises, in mass percent, the following components:

| | |
|---|---|
| $SiO_2$ | 40–65% |
| $Al_2O_3$ | 25–45% |
| $Li_2O$ | 5–15% |
| $B_2O_3$ | 0–3% |
| BaO | 0.5–4% |
| MgO | 0–2% |
| CaO | 0–3% |
| ZnO | 0–6% |
| $P_2O_5$ | 0–4% |
| $ZrO_2$ | 0–4% |
| $TiO_2$ | 0–4% |
| $As_2O_3 + Sb_2O_3$ | 0–2% | and the base glass is essentially free of PbO, $Na_2O$, and $K_2O$.

In accordance with further aspect of the invention, a method for producing a negative thermal expansion glass ceramic, comprises the steps of: melting a base glass; forming the molten base glass; annealing the formed base glass as needed; subjecting the formed product to a heat treatment at a temperature range of 620° C. to 800° C. to nucleate; and subjecting the resulting product to a heat treatment at a temperature range of 700° C. to 950° C. to crystallize; wherein the base glass comprises, in mass percent, the following components:

| | |
|---|---|
| $SiO_2$ | 40–65% |
| $Al_2O_3$ | 25–45% |
| $Li_2O$ | 5–15% |
| $B_2O_3$ | 0–3% |
| BaO | 0.5–4% |
| MgO | 0–2% |
| CaO | 0–3% |
| ZnO | 0–6% |
| $P_2O_5$ | 0–4% |
| $ZrO_2$ | 0–4% |
| $TiO_2$ | 0–4% |
| $As_2O_3 + Sb_2O_3$ | 0–2% | and the base glass is essentially free of PbO, $Na_2O$, and $K_2O$.

BRIEF DESCRIPTION OF THE DRAWINGS

The above and other objects, features and advantages of the invention will become more apparent from the following description taken in conjunction with the accompanying drawings wherein like references refer to like parts and wherein.

PREFERRED EMBODIMENT OF THE INVENTION

Hereinafter, the negative thermal expansion glass ceramic according to an embodiment of the present invention will be explained in detail.

In the present invention, the glass ceramic means material obtained by subjecting a glass to a heat treatment to deposit a crystalline phase in a glass phase to obtain the material. The glass ceramic includes not only the material which has both a glass phase and a crystalline phase but also the material in which all glass phases are phase-transited to crystalline phases, that is, the material in which an amount of crystals is 100 mass %.

The main crystalline phases of the negative thermal expansion glass ceramic according to the present invention are one or more types selected from a group consisting of β-eucryptite solid solution (β-$Li_2O.Al_2O_3.2SiO_2$ solid solution), β-eucryptite (β-$Li_2O.Al_2O_3.2SiO_2$)β-quartz solid solution (β-$SiO_2$ solid solution), and β-quartz (β-$SiO_2$).

The solid solution of the β-eucryptite or β-quartz crystals shows the one in which part of the crystals are substituted and/or atoms invade between the crystals.

These main crystalline phases are important factors contributing the coefficient of thermal expansion of the negative thermal expansion glass ceramic according to the present invention. The base glass is subjected to a heat treatment under determined conditions to deposit the main crystalline phase having the negative coefficient of thermal expansion in the glass phase having positive coefficient of thermal expansion or to phase-transit the all glass phases to crystalline phases containing the main crystalline phase, so that it is possible to control the coefficient of thermal expansion of the whole glass ceramic within the desired values.

Types and deposited amounts of these main crystalline phases are determined by a containing ratio of $Li_2O$, $Al_2O_3$ and $SiO_2$ in the particular composition range, and by a firing crystallization temperature or a crystallization temperature, described later. In order to obtain the objective coefficient of thermal expansion in the present invention, it is preferable that the total amount of crystals of the main crystalline phases are in the range of 70 to 100% in mass percent, while if it is a below 70%, the coefficient of thermal expansion may become higher than the objective range in the present invention.

The composition of oxides of the negative thermal expansion glass ceramic according to the present invention is expressed by the composition of oxides of the base glass thereof. The reasons for limiting the composition range of the base glass to the range above-described will be explained as follows.

The $SiO_2$, $Li_2O$, and $Al_2O_3$ components are important as constituents of the main crystalline phases which are the β-eucryptite solid solution, the β-eucryptite, the β-quartz solid solution, and the β-quartz.

The $SiO_2$ component is a main component of the main crystals having the negative coefficient of thermal expansion. When the $SiO_2$ content is below 40 mass %, it is difficult to sufficiently deposit the desired main crystalline phases. On the other hand, when the $SiO_2$ content exceeds 65 mass %, the base glass is difficult to melt and the glass melt is difficult to refine, moreover, a crystalline phase other than the desired main crystalline phases deposits. Accordingly, preferable range of the $SiO_2$ content is 40–65 mass %.

When the $Al_2O_3$ content is below 25 mass %, it is difficult to melt the base glass, so that the homogeneity thereof is deteriorated, and it becomes difficult to cause the desired main crystalline phase to be produced with the required amount. On the other hand, when the $Al_2O_3$ content exceeds 45 mass %, a melting point becomes too high, so that it becomes difficult to melt and the glass melt is difficult to refine. Thus, preferable range of the $Al_2O_3$ content is 25–45 mass %.

When the $Li_2O$ content is below 5 mass %, it becomes difficult to obtain the desired main crystalline phases of the required amount, while the $Li_2O$ content exceeds 15 mass %, the vitrification becomes difficult, further, the strength of the heat-treated glass ceramics deteriorates. Accordingly, preferable range of the $Li_2O$ content is 5–15 mass %.

The $B_2O_3$ component can be added at will for the purpose of improving melting property of the base glass or other purpose, however, this component forms the glass phase of the negative thermal expansion glass ceramic of the present invention. Thus, when the content thereof exceeds 3 mass %, which becomes obstacle to form the desired main crystalline phases, so that the coefficient of thermal expansion becomes larger than the objective value thereof.

The BaO, MgO, ZnO, and CaO components are important as constituents of the β-eucryptite solid solution (β-$Li_2O.Al_2O_3.2SiO_2$ solid solution) and the β-quartz solid solution (β-$SiO_2$ solid solution), however, when the content of each components exceeds 4 mass %, 2 mass %, 6 mass %, and 3 mass %, respectively, the coefficient of thermal expansion becomes large and it is difficult to obtain the glass ceramic having the desired coefficient of thermal expansion.

Among the respective components, the BaO component has effects to prevent alloying platinum of a crucible with other metallic elements in the base glass when the base glass is melted, and to maintain the resistance to devitrification of the base glass. However, when the BaO content is below 0.5 mass %, these effects can not be obtained sufficiently and the resistance to devitrification of the base glass is deteriorated, thus preferable content of the BaO component is not less than 0.5 mass %.

The $P_2O_5$, $ZrO_2$ and $TiO_2$ components work as nucleating agents of the crystals. When these contents of respective components exceed 4 mass %, the base glass is difficult to melt and the glass melt is difficult to refine, so that an unmelted thing may occur in the glass. Accordingly, among the each components, it is particularly preferable that the $TiO_2$ content is up to 3.5 mass %, and the $ZrO_2$ content is up to 2 mass %.

The $As_2O_3$ and $Sb_2O_3$ components can be added as refining agents in the melting process of the base glass in order to obtain the homogeneous products, however, the total amount of these are sufficient up to 2 mass %.

Other ingredients, such as coloring components may be added in the range of maintaining the desired properties of the glass ceramic of the present invention.

It is preferable that the glass ceramic is practically free of the PbO, $Na_2O$, and $K_2O$ components, because the PbO component requires costs for the environmental pollution control measure, and because if the glass ceramics contain $Na_2O$ or $K_2O$, ions thereof will diffuse at following steps, such as a film formation or a cleaning, so that the physical properties of the negative thermal expansion glass ceramic of the present invention vary.

It is preferable that the glass ceramic having the compositions according to the present invention is produced by two methods described as follows.

With both methods, the raw materials which are such as oxides, carbonates, hydroxides, nitrates, or the like are weighed, mixed to have the compositions above-described, respectively. The resulting mixture is charged in a crucible or the like, and melted with stirring at the temperature of about 1400–1500° C. for about 6–8 hours to obtain the base glass in a refined state. Then, the crystallization is performed by the two methods described as follows.

In the first method, the obtained base glass with a molten state is quenched by a roller quenching method, a water quenching method or other methods.

Then, the quenched glass is reduced to powders by known milling methods, such as a wet method or a dry method, using known mills, such as a ball mill, a planetary ball mill, or a roller mill. It is preferable that grain sizes of the glass powders are not more than 100 μm maximally, average grain size thereof is not more than 10 μm, and it is more preferable that the average grain size thereof is not more than 5 μm. When the maximal grain size exceeds 100 μm, a required temperature for firing crystallization described later becomes high and the homogeneity and closeness of the obtained glass ceramic deteriorate.

The glass powders obtained in this manner are formed into a desired shape by known forming methods, such as a press forming. In the forming process, polyvinylalcohol, stearic acid, polyethylene glycol or the like can be added as an organic binder. Particularly, in a case that the glass powders are formed into a large block-like shape, the mixing of the organic binder is preferable. For example, it is preferable that the organic binder solution, such as polyvinylalcohol of concentration of about 1–5 % is added 5–15 mass % against the powders as 100 mass %.

After the forming, a treatment of the firing to crystallize is carried out as a heat treatment. After the temperatures of the formed products are raised, the formed products are retained at 1200–1350° C. for about 2–10 hours to fire. Thereby, the desired main crystalline phases are deposited. After the crystallization by firing, because the crystals having the negative coefficient of thermal expansion are deposited, if they are quenched, cracks will be occurred. Therefore, it is preferable that they are annealed at a rate of not more than 50° C./hr.

In the case of performing the firing to crystallize, a retention at the nucleation temperature is not required, which is differ from the second method described later.

With the first method above-described, it is possible to obtain easily the products having the negative coefficient of thermal expansion, of which absolute values are remarkably large. Further, because the formed products are made from powders, a production of large size of products is possible.

Next, the second method will be explained.

The obtained base glass with molten state is cast in iron molds or the like to form, thereafter, the formed glass is annealed as needed, such as removing strains of the formed glass.

Then, the treatment of crystallization is carried out as a heat treatment. At first, the base glass is subjected to the heat treatment at the temperature of 620–800° C. to stimulate the nucleation. Neither if the nucleation temperature is lower than 620° C. nor higher than 800° C., nuclei of crystals are not generated.

After the nucleation, the base glass is subjected to the heat treatment at temperature of 700–950° C. to crystallize. When the crystallization temperature is lower than 700° C., the main crystalline phases of the sufficient amount are not grown, while when it is higher than 950° C., the base glass is melted and the crystals, such as β-spodumene or the like having large coefficient of thermal expansion are deposited, so that these are undesirable. After the crystallization, as described in the first method, it is preferable that the crystallized product is annealed at the rate of not more than 50° C./hr.

In the second method, compared with the first method in which the powders are formed to fire, the processes of milling the base glass and forming the powders are not required, so that it is possible to reduce the costs and times, which the production requires. Further, because the formed products do not contain pores, the glass ceramic having higher strength is able to be obtained.

EXAMPLES

The negative thermal expansion glass ceramics according to the examples of the present invention will be explained as follows. However, the invention is, of course, not limited to the examples.

Tables 1 and 2 show composition ratios, firing crystallization temperatures and retention times, or nucleation temperatures and retention times, crystallization temperatures and retention times, of the glass ceramics according to the examples No.1 to No.7 of the invention.

The glass ceramics according to the examples No.1 to No.7 were produced as follows.

At first, the raw materials which were such as oxides, carbonates, hydroxides, nitrates, or the like were weighed and mixed to have the compositions in Tables 1 and 2, respectively, charged in a platinum crucible, melted with stirring at the temperatures of about 1400–1550° C. for 6–8 hours, using a general apparatus for melting.

Thereafter, with regard to examples No.1, No.2, and No.3, the base glasses in molten state were quenched by submerging.

Subsequently, the obtained formed products of glasses were reduced to powders having the average grain size of approximately 5 μm by an alumina ball mill.

Then, the organic binder was added to the powders and the powders were formed by an uniaxial pressing.

Thereafter, resulting compacts were put in a furnace, heated to raise temperatures and retained at the firing crystallization temperatures shown in Table 1 for the determined times to crystallize, thereafter, annealed at the rate of not more than 50° C./hr. Thus, the glass ceramics were obtained.

With regard to examples No.4, No.5, No.6 and No.7, the base glasses in the molten state were cast in the iron molds to form, thereafter annealed, thus the formed products of glasses were obtained, respectively.

Thereafter, the formed products of glasses were not milled, but put in the furnace, heated to raise temperatures and retained at the nucleation temperatures shown in Table 2 for the determined times to generate nuclei of the crystals. Subsequently, the resulting products were heated to raise temperatures and retained at the crystallization temperatures shown in Table 2 for the determined times to crystallize, thereafter annealed at the rate of not more than 50° C./hr. Thus, the glass ceramics were obtained.

From the glass ceramics according to the respective examples obtained as above-described, samples having diameter of 5 mm and length of 20 mm were cut out, and measured the coefficient of thermal expansion in the temperature range of −40° C. to +160° C. by RIGAKU Inc. TAS200 thermomechanical analytical instrument.

The total amounts of crystals of the main crystalline phases of these glass ceramics were calculated from peak areas obtained by powder X-ray diffraction method.

The results are shown in Tables 1 and 2.

Prior glass ceramics as comparative examples No.1 to No.3 are shown in Table 3, similarly in Tables 1 and 2.

The glass ceramics of the comparative examples No.1 and No.2 were produced by the same method as that of the examples No.4 to No. 7, and the glass ceramics of the comparative example No.3 were produced by the same method as that of the examples No.1 to No.3.

The coefficients of thermal expansion and the total amounts of crystals of the main crystalline phases of the glass ceramics of comparative examples were measured by the same method as above-described, and the results thereof are shown in Table 3.

TABLE 1

| | Examples | | |
|---|---|---|---|
| | No. 1 | 2 | 3 |
| Glass composition (in mass %) | | | |
| SiO$_2$ | 47.0 | 46.0 | 48.0 |
| Al$_2$O$_3$ | 40.0 | 40.0 | 38.0 |
| Li$_2$O | 12.0 | 12.0 | 11.0 |
| B$_2$O$_3$ | | | 1.0 |
| BaO | 1.0 | 1.0 | 0.5 |
| MgO | | | 0.5 |
| ZnO | | 1.0 | 1.0 |

TABLE 1-continued

| | Examples | | |
|---|---|---|---|
| | No. 1 | 2 | 3 |
| Total amount of crystals of main crystalline phases (in mass %) | 95 | 85 | 70 |
| Firing crystallization temperature (° C.) | 1250 | 1300 | 1250 |
| Retention time (hr) | 7 | 4 | 4 |
| Coefficient of thermal expansion ($\times 10^{-7}/°$ C.) ($-40°$ C. to $+160°$ C.) | $-93$ | $-73$ | $-36$ |

TABLE 2

| | Examples | | | |
|---|---|---|---|---|
| | No. 4 | 5 | 6 | 7 |
| Glass composition (in mass %) | | | | |
| $SiO_2$ | 46.5 | 57.0 | 59.5 | 47.4 |
| $Al_2O_3$ | 39.5 | 25.0 | 25.0 | 34.6 |
| $Li_2O$ | 11.5 | 5.5 | 5.0 | 11.0 |
| BaO | 0.5 | 1.0 | 0.5 | 2.0 |
| CaO | 0.5 | | | 2.0 |
| ZnO | | 6.0 | 4.5 | |
| $P_2O_5$ | | | 0.5 | |
| $TiO_2$ | 1.0 | 2.5 | 2.5 | 2.0 |
| $ZrO_2$ | 0.5 | 2.0 | 2.0 | 0.5 |
| $As_2O_3$ | | 1.0 | | |
| $Sb_2O_3$ | | | 0.5 | 0.5 |
| Total amount of crystals of main crystalline phases (in mass %) | 90 | 80 | 80 | 85 |
| Nucleation temperature (° C.) | 640 | 700 | 720 | 640 |
| Retention time (hr) | 5 | 5 | 5 | 5 |
| Crystallization temperature (° C.) | 720 | 780 | 800 | 720 |
| Retention time (hr) | 5 | 5 | 5 | 5 |
| Coefficient of thermal expansion ($\times 10^{-7}/°$ C.) ($-40°$ C. to $+160°$ C.) | $-96$ | $-28$ | $-26$ | $-80$ |

TABLE 3

| | Comparative examples | | |
|---|---|---|---|
| | No. 1 | 2 | 3 |
| Glass composition (in mass %) | | | |
| $SiO_2$ | 57.5 | 56.5 | 46.0 |
| $Al_2O_3$ | 24.0 | 26.3 | 38.0 |
| $Li_2O$ | 7.0 | 5.0 | 11.0 |
| $B_2O_3$ | | | 4.0 |
| BaO | 3.0 | | 0.5 |
| MgO | 1.0 | 1.0 | |
| ZnO | 2.0 | 1.5 | 0.5 |
| $P_2O_5$ | | 4.9 | |
| $TiO_2$ | 2.5 | 2.3 | |
| $ZrO_2$ | 2.0 | 2.0 | |
| $As_2O_3$ | 1.0 | 0.5 | |
| Total amount of crystals of main crystalline phases (in mass %) | 65 | 65 | 40 |
| Nucleation temperature (° C.) | 700 | 700 | |
| Retention time (hr) | 5 | 5 | |
| Crystallization temperature (° C.) | 780 | 780 | |
| Retention time (hr) | 5 | 5 | |
| Firing crystallization temperature (° C.) | | | 1200 |
| Retention time (hr) | | | 4 |
| Coefficient of thermal expansion ($\times 10^{-7}/°$ C.) ($-40°$ C. to $+160°$ C.) | $-6$ | $-1$ | $-5$ |

As shown in Tables 1 and 2, the glass ceramics according to the examples of the present invention have the coefficients of thermal expansion of $-26$ to $-96 \times 10^{-7}/°$ C. which are very large negative absolute values.

As a result of the X-ray diffractometry, the main crystalline phase of the glass ceramics of the examples No.1 and No.7 are the β-eucryptite (β-$Li_2O.Al_2O_3.2SiO_2$), the main crystalline phases of the examples No.2, No.3, and No.4 are the β-eucryptite solid solution (β-$Li_2O.Al_2O_3.2SiO_2$ solid solution), and the main crystalline phases of the examples No.5 and No.6 are the β-quartz solid solution (β-$SiO_2$ solid solution).

On the other hand, as a result of the X-ray diffractometry, the β-quartz solid solution is deposited in the comparative examples No.1, No.2, and No.3, so that the glass ceramics have the negative coefficients of thermal expansion, as shown in Table 3, however, it is not possible to obtain the glass ceramics having the negative coefficients of large absolute values.

Figure 1:
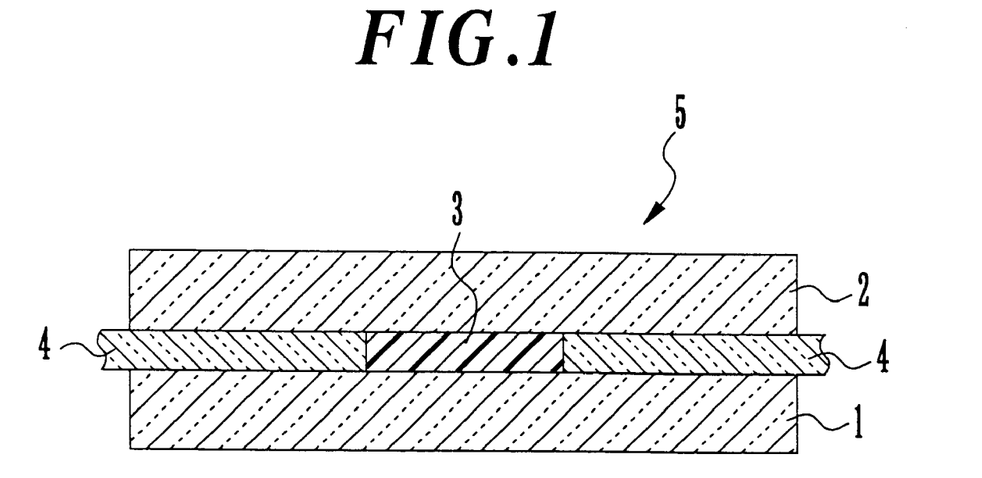
FIG. 1 is a sectional side view of an assembly in which a glass ceramic according to an embodiment of the present invention is used as a temperature compensating member.

The glass ceramic obtained in example No.4 was cut and polished, to make a plane plate 1 having a dimension of length of 30 mm×width of 15 mm×thickness of 2 mm and a cover plate 2 of the same dimension, as temperature compensating members. A groove for setting the optical fiber was cut in the top surface of the plane plate 1 by a diamond saw.

Then, an optical fiber 4 of quartz system, having a refractive index grating 3 of length of 10 mm was fitted in the groove so that the refractive index grating 3 would position at the center of the plane plate 1.

Then, in a state that the optical fiber 4 and the refractive index grating 3 were covered with the cover plate 2, the plane plate 1 and the cover plate 2 were bonded to join by using adhesives, so that an assembly 5 shown in FIG. 1 was made. For the joining, conventionally known adhesive, such as the thermally cured resin of epoxy or the like can be used. In this example, thermally cured epoxy adhesive was used.

An assembly which was the same as the one in FIG. 1 was made by using the comparative example No.1 (not shown).

Reflection wavelengths obtained from the respective refractive index gratings of the assembly 5 in FIG. 1 and of the assembly with the comparative example No.1 were measured with varying the temperatures in the range of $-40°$ C. to $100°$ C. and compared each other. As a result, with the assembly 5 using the glass ceramic according to the present invention, temperature dependence of the reflection wavelength from the refractive index grating was drastically reduced and stable reflection wavelengths were obtained within the temperature range, compared with the assembly using the glass ceramic of the comparative example No.1.

Figure 2:
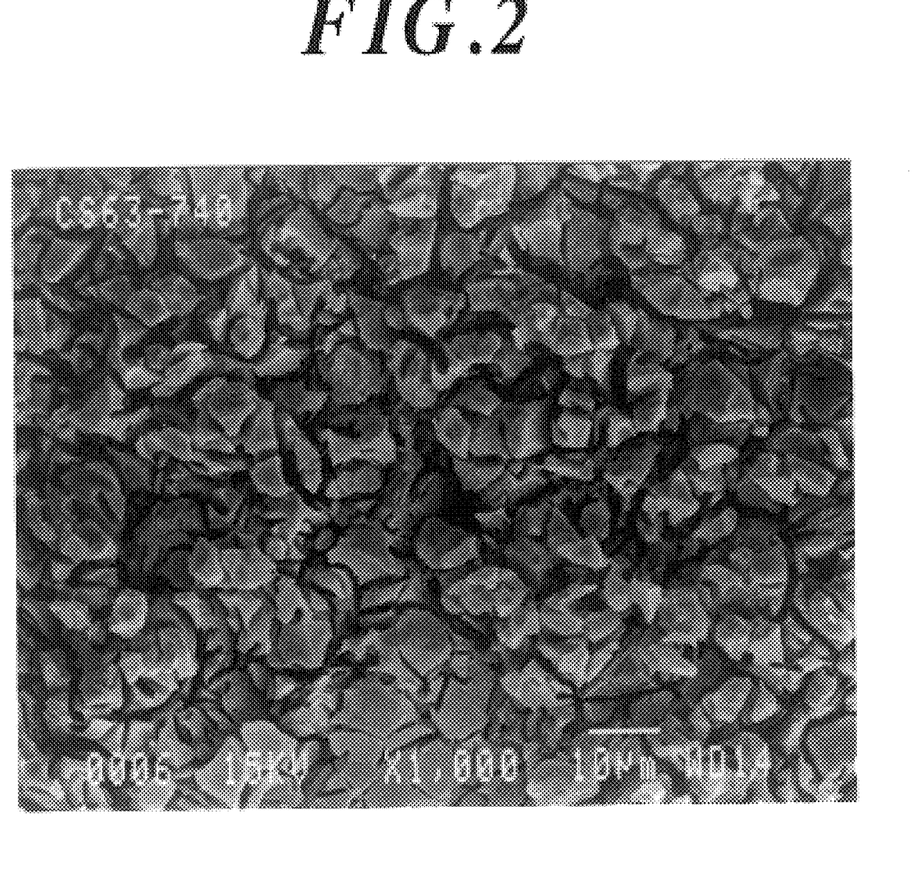
FIG. 2 is a SEM photograph (scanning electron microscope photograph) showing a surface of a glass ceramic according to an embodiment of the present Invention.

A SEM photograph (scanning electron microscope photograph) is shown in FIG. 2, which was taken after the surface of the glass ceramic of example No.2 was mirror polished and etched by hydrofluoric acid. As shown in FIG. 2, crystal grains which are deposited in the glass ceramic disperse three-dimensionally without having the orientation. Accordingly, it is presumed that the glass ceramic of example No.2 has little anisotropy inside.

As described above, the negative thermal expansion glass ceramic of the present invention have coefficient of thermal expansion of $-25$ to $-100\times10^{-7}/°$ C. in the temperature range of $-40°$ C. to $+160°$ C., that is, the glass ceramic has the negative coefficient of thermal expansion which is a sufficiently large absolute value. Accordingly, in optical fiber-related devices, such as an optical fiber refractive index grating or a connector of optical fiber in the optical communication field or the like, influences by the temperature changes can be prevented to the utmost by using the glass ceramic, with combining with a material having a positive coefficient of thermal expansion, so that the glass ceramic can function as temperature compensating members. Further, because the glass ceramic has little anisotropy as a material, the problems caused by the anisotropy in the forming process or the problems of variation of the physical properties are not occurred, thereby it is possible to suitably apply the glass ceramic to the devices related to the optical fiber, compared with the prior liquid crystal polymer or the like.

Further, because of the negative thermal expansion, the glass ceramic can be used as bulk-like materials in the wide use in the energy-related field, the information communication field, the electronics field or other fields.

The negative thermal expansion glass ceramic according to the present invention is milled by the known mills, such as a ball mill, a vibrating mill, a roller mill, or a jet mill to have grain sizes of not more than 100 $\mu$m, preferably not more than 50 $\mu$m, and mixed with the organic substances or inorganic substances used in the respective fields, thereby the coefficients of thermal expansion of these substances are reduced. Therefore, the milled glass ceramic can be used as a filler for reducing the thermal expansion, which is superior in dimension stability.

These organic substances and the inorganic substances are, not limited, for example, phenol resin, epoxy resin, polyamide resin, polycarbonate resin, or low-melting point glass. These also have wide uses, such as an industrial use or an architectural use.

The negative thermal expansion glass ceramic according to the present invention can be produced by melting the base glass at a relatively low temperature compared with the prior technology, thereby it is possible to produce the glass ceramic with the low cost. Moreover, the glass ceramic contains the components which can easily control the composition ratio, but does not contain the components which are unstable in the composition, so that the glass ceramic can be produced stably in terms of the composition and physical properties.

From the foregoing description, one skilled in the art can easily ascertain the essential characteristics of this invention, and without departing from the spirit and scope thereof, can make various changes and modifications of the invention to adapt it to various usage and conditions.

What is claimed is:

1. A negative thermal expansion glass ceramic produced by subjecting a base glass to a heat treatment, wherein the base glass comprises, in mass percent, the following components:

| | |
|---|---|
| $SiO_2$ | 40–65% |
| $Al_2O_3$ | 25–45% |
| $Li_2O$ | 5.5–15% |
| $B_2O_3$ | 0–3% |
| BaO | 0.5–4% |
| MgO | 0–2% |
| CaO | 0–3% |
| ZnO | 0–6% |
| $P_2O_5$ | 0–4% |
| $ZrO_2$ | 0–4% |
| $TiO_2$ | 0–4% |
| $As_2O_3 + Sb_2O_3$ | 0–2% | and the base glass is essentially free of PbO, $Na_2O$, and $K_2O$, wherein the negative thermal expansion glass ceramic has a coefficient of thermal expansion of $-25$ to $-100\times10^{-7}/°$ C. in the temperature range of from $-40°$ C. to $+160°$ C.

2. The negative thermal expansion glass ceramic of claim 1, comprising a main crystalline phase which is at least one crystalline phase selected from the group consisting of β-eucryptite solid solution, β-eucryptite, β-quartz solid solution, and β-quartz.

3. The negative thermal expansion glass ceramic of claim 1, wherein a total amount of crystals of the main crystalline phases is from 70 to 100 mass percent.

4. The negative thermal expansion glass ceramic as claimed in claim 1, wherein the glass ceramic is produced by melting the base glass to form a molten glass, quenching the molten glass, reducing the quenched glass to powder, forming the powder into a product, and firing the formed product to crystallize the product.

5. The negative thermal expansion glass ceramic as claimed in claim 1, wherein the glass ceramic is produced by melting the base glass to form a molten glass, forming the molten glass into a product, and heating the formed product to crystallize the product.

6. A method for producing a negative thermal expansion glass ceramic, comprising the steps of:

melting a base glass;

quenching the molten base glass;

reducing the quenched base glass to a powder;

forming the powder into a product; and firing the formed product at a temperature range of 1200° C. to 1350° C. to crystallize the product, the product having a coefficient of thermal expansion of from $-25$ to $-100\times10^{-7}/°$C. in the temperature range of from $-40°$ C. to $=160°$ C.:

wherein the base glass comprises, in mass percent, the following components:

| | |
|---|---|
| $SiO_2$ | 40–65% |
| $Al_2O_3$ | 25–45% |
| $Li_2O$ | 5–15% |
| $B_2O_3$ | 0–3% |
| BaO | 0.5–4% |
| MgO | 0–2% |
| CaO | 0–3% |
| ZnO | 0–6% |
| $P_2O_5$ | 0–4% |
| $ZrO_2$ | 0–4% |
| $TiO_2$ | 0–4% |
| $As_2O_3 + Sb_2O_3$ | 0–2% | and the base glass is essentially free of PbO, $Na_2O$, and $K_2O$.

7. A method for producing a negative thermal expansion glass ceramic, comprising the steps of:

melting a base glass to form a molten base glass;

forming the molten base glass into a product;

heat treating the formed product at a temperature range of 620° C. to 800° C. to nucleate the product; and heat treating the resulting product at a temperature range of 700° C. to 950° C. to crystallize the product, the product having a coefficient of thermal expansion of from −25 to −100×10$^{-7}$/°C. in the temperature range of from −40° C. to =160° C.:

wherein the base glass comprises, in mass percent, the following components:

| | |
|---|---|
| SiO$_2$ | 40–65% |
| Al$_2$O$_3$ | 25–45% |
| Li$_2$O | 5.5–15% |
| B$_2$O$_3$ | 0–3% |
| BaO | 0.5–4% |
| MgO | 0–2% |
| CaO | 0–3% |
| ZnO | 0–6% |
| P$_2$O$_5$ | 0–4% |
| ZrO$_2$ | 0–4% |
| TiO$_2$ | 0–4% |
| As$_2$O$_3$ + Sb$_2$O$_3$ | 0–2% | and the base glass is essentially free of PbO, Na$_2$O, and K$_2$O.

8. The negative thermal expansion glass ceramic according to claim 5, wherein the formed glass is annealed after forming the molten glass and before heating the formed product.

9. The method for producing a negative thermal expansion glass ceramic according to claim 7, further comprising annealing the formed base glass, after forming the molten base glass and before subjecting the formed product to the heat treatment.

10. The negative thermal expansion glass ceramic of claim 1, comprising from 0 to less than 4 mass percent of ZrO$_2$.

* * * * *

UNITED STATES PATENT AND TRADEMARK OFFICE
CERTIFICATE OF CORRECTION

PATENT NO.    : 6,506,699 B1
DATED         : January 14, 2003
INVENTOR(S)   : Ayako Shindo et al.

It is certified that error appears in the above-identified patent and that said Letters Patent is hereby corrected as shown below:

<u>Title page,</u>
Item [*], Notice, insert -- This patent is subject to a Terminal Disclaimer. --

<u>Column 14,</u>
Line 48, change "-40°C. to =160°C." to -- -40°C. to +160°C. --;
Line 56, change "5-15%" to -- 5.5-15% --.

<u>Column 15,</u>
Line 9, change "-40°C. to =160°C." to -- -40°C. to +160°C. --

Signed and Sealed this

Twenty-fourth Day of June, 2003

JAMES E. ROGAN
*Director of the United States Patent and Trademark Office*